United States Patent [19]

Nair et al.

[11] Patent Number: 4,563,285

[45] Date of Patent: Jan. 7, 1986

[54] METHOD FOR DEWATERING PHOSPHATE SLIMES

[75] Inventors: Krishnapillai V. Nair; Ponisseril Somasundaran, both of Nyack, N.Y.

[73] Assignee: The Trustees of Columbia University in the City of New York, New York, N.Y.

[21] Appl. No.: 639,253

[22] Filed: Aug. 9, 1984

[51] Int. Cl.[4] ............................................. C02F 1/52
[52] U.S. Cl. ...................................... 210/714; 209/5; 210/717; 210/724; 210/726; 210/907
[58] Field of Search ................... 209/5; 210/702, 714, 210/724, 726, 907, 717

[56] References Cited

U.S. PATENT DOCUMENTS

| | | | |
|---|---|---|---|
| 3,450,633 | 6/1969 | Siemers | 210/907 |
| 3,680,698 | 8/1972 | Liu et al. | 210/907 |
| 3,761,239 | 9/1973 | Cook et al. | 210/907 |
| 3,763,041 | 10/1973 | Cook et al. | 210/714 |

Primary Examiner—Peter Hruskoci

Attorney, Agent, or Firm—John P. White

[57] ABSTRACT

A method for dewatering phosphate slimes and recovering a liquid solution involves adding a calcium sulfate hemihydrate to the slimes, mixing the resulting admixture to effect formation of calcium sulfate dihydrate crystals in the admixture, and recovering a liquid solution from the resulting crystal-containing admixture.

The calcium sulfate hemihydrate addition may be followed by addition of calcium sulfate dihydrate. The calcium sulfate hemihydrate addition may be preceded by acidification of the slimes to pH 1–3 with sulfuric acid, which addition may be followed by the addition of other calcium salts to the slimes.

A sufficient amount of calcium oxide or calcium carbonate or both may be added to the recovered liquid solution to raise the pH of the liquid solution to a value above about 6.0. Mixing permits calcium phosphate salts to precipitate, allowing for separately recovering the calcium phosphate salts and a dephosphated liquid portion.

8 Claims, No Drawings

METHOD FOR DEWATERING PHOSPHATE SLIMES

BACKGROUND OF THE INVENTION

One of the most water-intensive industries in the United States is the processing of phosphate rock mineral. A major part of this industry is located in Florida which processes over 80% of the mineral processed in the whole country. During such processing extraneous, undesirable material in the ore, e.g., clay and slica, accumulates in the form of an unsettable very fine suspension in the water. This water is employed for washing and flotation-concentration of the crushed ore. The flotation tailings typically consisting of 150 mesh sand easily dewater. The clay slime, however, does not settle easily. The slime is stored in earthen dams where the initial 4 to 5 percent solids becomes 15 to 25 percent over several years of settling, and eventually to 30 to 55 percent solids in the course of 20 to 30 years. The phosphate values in the slime cannot be recovered because of the difficulty of initial dewatering and the high cost of chemicals required for successful flotation.

Thus, very large tonnages of water drawn from natural sources are held up as slime and cannot be immediately reused. Phosphate mining has already lowered the fresh water table in some places like the Polk Country.

Several Governmental and Industrial Research Organizations are engaged in establishing economical methods to dewater the Florida phosphate industry's slimes. The techniques developed so far include flocculation and consolidation of the particles by addition of various electrolytes, flocculation and consolidation by techniques involving freezing and thawing and electroosmosis, with or without filtration. So far it cannot be said that any one of the methods investigated has met with complete success.

Other techniques under development include chemically hardening phosphatic clays by the addition of lime or gypsum to the clays. In addition, the use of accelerators or surfactants in combination with lime or gypsum are being tested. See Florida Institute of Phosphate Research, Information Clearinghouse Newsletter; Volume V, Number 2; Summer 1984. C. C. Cooke et al., U.S. Pat. Nos. 3,761,239(1973) and 3,763,041(1973) describes a method for making a land-fill composition from slimes. This method involves mixing the slimes with tailings. Large amounts of tailings are used, preferably between 60 and 99 percent by weight based on the weight of the slimes. This admixture of slimes with tailings dewater at a substantially greater rate than is achieved using gravity settling. Optionally, after the slime is dewatered calcium sulfate may be incorporated into the reconstituted landfill compositions to produce a fertile landfill having acceptable bearing strength. A method has now been discovered for dewatering phosphate slimes which involves adding calcium sulfate to the slimes, but which does not require the addition of tailings. The method is surprisingly effective in permitting the separation of the liquid and solid components of the slimes and allows for recovery of dissolved mineral values.

SUMMARY OF THE INVENTION

The method of the invention enables the separation of water content from the slime in reusable form. The method of this invention also enables the phosphate content to be separated from the slime. This method involves adding calcium sulfate hemihydrate; commonly known as plaster of paris, to the slime. The resulting mixture is then mixed to effect the formation of calcium sulfate dihydrate; commonly known as gypsum, crystals in the admixture. The liquid solution is then recovered from the resulting crystal-containing admixture by filtration, decantation or centrifugation. In one embodiment the calcium sulfate hemihydrate addition is preceded by addition of sulfuric acid to the slimes to reduce the pH of the slimes to a value from about 1 to 3. The addition of sulfuric acid results in the chemical dissolution of the phosphatic contents of the slime into the aqueous medium. That is calcium phosphate is converted into monocalcium phosphate which is water soluble. This renders the remaining solids in the slime more readily separable from the liquid portion. This reaction of calcium phosphate being converted into monocalcium phosphate is illustrated by the following equation:

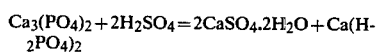

$$Ca_3(PO_4)_2 + 2H_2SO_4 = 2CaSO_4.2H_2O + Ca(H_2PO_4)_2$$

A further embodiment involves filtering the slime after the sulfuric acid and calcium sulfate hemihydrate treatment and adding a calcium salt such as calcium oxide or calcium carbonate or both to the filtrate to raise the pH of the filtrate to a value above 6.0, e.g., to a value between 6.2 and 6.5. The addition of calcium oxide or calcium carbonate will produce precipitates of calcium phosphate salts and other metallic phosphates after the solution is thoroughly mixed.

The liquid portion should be mixed or otherwise agitated during the addition of the calcium salt to ensure that the proper pH is reached. The calcium phosphate salts and the dephosphated liquid portion may be separately recovered by methods such as filtering, decanting or centrifuging.

DETAILED DESCRIPTION OF THE INVENTION

Phosphate slimes may be dewatered by adding calcium sulfate hemihydrate to the slime. Preferably, calcium sulfate hemihydrate is added in an amount equivalent to the total weight percent of solids in the slime. More calcium sulfate hemihydrate may be added to the slime but if more is added there will be a corresponding decrease in the water recovered from the slime. Likewise, if less calcium sulfate hemihydrate is added the phosphate slime will not be completely dewatered. Therefore, the optimum amount of calcium sulfate hemihydrate to be added to the slime is an amount equivalent to the total weight percent of solids present in the slime to be dewatered.

Upon addition of calcium sulfate hemihydrate to the slime and agitation of the admixture calcium sulfate dihydrate crystals are formed in the admixture and a liquid solution can be recovered from the admixture. By this method the calcium sulfate dihydrate crystals are formed upon suspended particles. Such crystals may enmesh more than one suspended particle. Thus the nature of slimes which cannot be settled, or which can be settled only with difficulty, is altered, and the solids become easily separable from the liquid portion by known methods of separation, e.g., filtration, centrifugation or decantation.

In one embodiment the calcium sulfate hemihydrate addition is followed by the addition of calcium sulfate dihydrate. The addition of calcium sulfate dihydrate increases the favorable filter medium and enmeshes smaller particles making separation of the solids easier.

It should be remembered that the total the amount of calcium sulfate dihydrate and calcium sulfate hemihydrate added to the slime is preferably equivalent to the total weight percent of solids in the slime. The proportion of calcium sulfate dihydrate to calcium sulfate hemihydrate will vary depending on the type of particles to be separated. If smaller particles need to be enmeshed then a greater proportion of calcium sulfate dihydrate should be added. In a preferred embodiment, the calcium sulfate hemihydrate addition is preceded by addition of sulfuric acid to the slimes to reduce the pH of the slimes to a value from about 1 to 3. The amount of acid added to the slime to reduce the pH will vary from slime to slime. The addition of sulfuric acid converts the calcium phosphate in the slime into monocalcium phosphate, the only water soluble calcium phosphate. The equation for this reaction is $Ca_3(PO_4)_2 + 2H_2SO_4 = 2CaSO_4.2H_2O + Ca(H_2PO_4)_2$. The addition of calcium salt to this solution permits the precipitation of calcium phosphate salts and allows for separately recovering the calcium phosphate salts and a dephosphated liquid portion. To accomplish the precipitation of calcium phosphate salts another embodiment of this invention involves adding to the liquid solution, after the addition of sulfuric acid, a calcium salt such as calcium oxide or calcium carbonate or both to raise the pH of the liquid solution to a value above about 6.0, e.g., 6.2–6.5. As with the addition of sulfuric acid the amount of calcium salt needed to be added to raise the pH will vary from slime to slime. Preferably, the liquid portion should be agitated during the addition of calcium oxide or carbonate to ensure mixing so the proper pH is reached. As in the other embodiments of this invention, the liquid portion and the solids are separately recovered by known methods of separation including, e.g., filtration, decantation and centrifugation.

EXAMPLES

EXAMPLE 1

Five liters of a sample of phosphatic clay slime procured from a working plant in Florida, was placed in a ten liter vessel fitted with a variable speed stirrer. Analysis indicated that the slime contained 5.05% (wt/vol) suspended solids and 0.35% $P_2O_5$ (wt/vol).

The slime was stirred at 100 rpm while sulfuric acid (1N) was added dropwise at a rate of one drop per second. When the pH of the slime reached 2.6, the addition of acid was stopped and stirring was continued until the pH was constant for fifteen minutes. This pH was 2.86.

The stirring rate was then decreased to 50 rpm and a slurry of 45 gm. of calcium sulfate hemihydrate in 100 ml. water was added to the slime. The stirring was continued for one hour.

The slurry was then filtered through a medium of drill cloth using a Buchner funnel and a vacuum of 20 in. of Hg. The filter cake was washed with 100 ml. of water in three lots and the filtrate and wash water were then placed in a clean ten liter vessel. A slurry of 5% CaO in water was then added to the stirred (300 rpm) solution at a rate of five ml/min. Addition of CaO was stoppd when the pH of the slurry reached a value of 6.5. Stirring was continued for fifteen minutes more, at the end of which time the slurry was filtered through the Buchner filter with a vacuum of 20 in. of Hg using a fresh filter.

The dried cake of phosphate weighed 38 gm. Analysis indicated the presence of 35.7% $P_2O_5$. Since the total $P_2O_5$ originally present in the slime was 17.5 gm., the above yield represents a recovery of 77%. The filtrate of the clear water represents a recovery of 92% of the original volume of water.

EXAMPLE 2

Five liters of another sample of phosphatic clay slime was placed in a ten liter vessel fitted with variable speed stirrer.

The following sequence of operations was carried out employing the indicated parameters:
1. Addition of sulfuric acid
   Stirrer speed: 150 rpm
   Rate of addition: 1 ml/min
   Strength of acid: 10
   Final pH: 1.9
2. Addition of calcium sulfate hemihydrate slurry
   Strength of slurry: 50%. Weight of $CaSO_4.1/2 H_2O = 50$ gm.
   Rate of addition: All at once
   Stirring rate: 50 rpm.
   Time of stirring: 45 minutes.
3. Addition of gypsum: Phospho-gypsum, produced by the action of sulfuric acid on rock phosphate during the manufacture of wet process phosphoric acid was used.
   Weight added: 50 gm.
4. Filtered as in Example 1.
5. Filtrate treated with CaO powder slurry
   Strength of slurry: 15% in water
   Stirring rate: 300 rpm.
   Final pH: 6.2
   Time of stirring: 1.5 hours
6. The slurry was filtered as in Example 1. No washing was done.
7. Volume of water obtained as filtrate was 4700 ml, representing 94% recovery.
   Dry weight of phosphates: 58.2
   $P_2O_5$ in the above: 37.2%
   Percentage recovery: 76%

EXAMPLE 3

Five liters of a phosphatic clay slime containing 3.5% suspended solids and containing 0.24% $P_2O_5$ (w/vol) were placed in a ten liter vessel fitted with a variable speed stirrer. While stirring the slurry at a rate of 75 rpm, a 20% water slurry of calcium sulfate hemihydrate containing 50 gm was added at a rate of 10 ml/min. After the addition, the slurry was agitated at 50 rpm for half an hour more and then 150 gm of phospho-gypsum were added. The mass was stirred for five minutes at 300 rpm and was then filtered through drill cloth in a Buchner funnel of 15 cm. diameter, with a vacuum of 20 inches of Hg. The filtration was completed in 12 minutes. The original slime would not filter through the same medium.

The volume of liquid obtained by dewatering the slime was 4700 ml. i.e., 94% of the original volume of the slime.

EXAMPLE 4

8 liters of slime containing 5.05% solids was treated with 300 gm of $CaSO_4.1/2H_2O$ added in small portions over the course of 30 minutes. Stirring was at 75 rpm. After the addition, the admixture was stirred for 30 more minutes and filtered with a vacuum of 20 Hg through a 15" diameter Buchner funnel using drill cloth. Filtration was completed in 12 minutes. The volume of water recovered by dewatering the slime was 7360 ml. i.e., 92% of the original 8 liters.

What is claimed:

1. A method for dewatering phosphate slimes and recovering a water solution comprising adding calcium sulfate hemihydrate to the slimes, in an amount equivalent to the total weight percent of solids in the slime, mixing the resulting admixture to effect formation of calcium sulfate dihydrate crystals in the admixture, and dewatering the admixture to recover a water solution from the resulting crystal-containing admixture.

2. A method to claim 1, wherein the calcium sulfate hemihydrate addition is followed by the addition of calcium sulfate dihydrate in an amount sufficient to enhance the separation of solids from the slime.

3. A method according to claim 1, wherein the calcium sulfate hemihydrate addition is preceded by addition of sulfuric acid to the slimes to reduce the pH of the slimes to a value from about 1 to 3 in order to solubilize phosphates in the slime.

4. A method according to claim 1, wherein the dewatering and recovering comprises filtering, decanting or centrifuging.

5. A method according to claim 3, which further comprises adding a calcium salt to the liquid solution to raise the pH of the liquid solution to a value above about 6.0, mixing the liquid solution to permit calcium phosphate salts to precipitate and separately recovering the calcium phosphate salts and a dephosphated liquid portion.

6. A method according to claim 5, wherein the calcium salt is selected from the group consisting of calcium oxide, calcium carbonate and mixtures thereof.

7. A method according to claim 6, wherein the pH is raised to a value between about 6.2 and 6.5.

8. A method according to claim 5, wherein the separately recovering comprises filtering, decanting or centrifuging.

* * * * *